United States Patent
Maclaren-Taylor

(10) Patent No.: US 11,274,790 B2
(45) Date of Patent: Mar. 15, 2022

(54) WALL MOUNT

(71) Applicant: Andrew-Keith Maclaren-Taylor, Johannesburg (ZA)

(72) Inventor: Andrew-Keith Maclaren-Taylor, Johannesburg (ZA)

( * ) Notice: Subject to any disclaimer, the term of this patent is extended or adjusted under 35 U.S.C. 154(b) by 59 days.

(21) Appl. No.: 16/003,630

(22) Filed: Jun. 8, 2018

(65) Prior Publication Data

US 2019/0374057 A1 Dec. 12, 2019

(51) Int. Cl.
*F16M 13/02* (2006.01)
*A47K 10/12* (2006.01)
*F16B 2/12* (2006.01)

(52) U.S. Cl.
CPC ............ *F16M 13/022* (2013.01); *A47K 10/12* (2013.01); *F16B 2/12* (2013.01); *A47K 2201/02* (2013.01)

(58) Field of Classification Search
CPC ............ A47K 2201/00; A47K 2201/02; A47K 10/04; A47K 10/10; A47K 10/12; A47K 10/16; A47K 10/18; A47K 17/022; A47G 1/1606; A47G 1/1613; A47G 1/164; A47G 1/1686; A47G 1/21; F16M 13/022; F16B 2/12
USPC .............. 211/6, 16, 88.04, 105.1–105.6, 123; 4/576.1, 571.1, 611; 248/309.1, 223.41, 248/224.51
See application file for complete search history.

(56) References Cited

U.S. PATENT DOCUMENTS

| | | | | |
|---|---|---|---|---|
| 2,893,676 A | * | 7/1959 | Connors | A47K 1/08 248/222.14 |
| 4,769,985 A | * | 9/1988 | Moritz | F16G 13/16 248/49 |
| 5,125,175 A | * | 6/1992 | Huff, Jr. | G09F 1/12 40/718 |
| 6,199,808 B1 | * | 3/2001 | Lin | A47K 10/10 211/105 |
| 6,250,597 B1 | * | 6/2001 | Kuo | A47K 10/10 211/16 |
| 6,659,418 B2 | * | 12/2003 | Lemire | A47G 1/0655 248/476 |
| 7,111,336 B1 | * | 9/2006 | Lai | A47K 10/04 211/105.1 |

(Continued)

FOREIGN PATENT DOCUMENTS

AU 2012280895 1/2013
ZA 201205046 8/2013

*Primary Examiner* — Jonathan Liu
*Assistant Examiner* — Guang H Guan
(74) *Attorney, Agent, or Firm* — Nixon & Vanderhye

(57) ABSTRACT

A mounting system for a wall mounted accessory includes a mounting plate and a mountable component that includes a clamping means having a clamp head with a first clamp surface, a threaded elongate member engaged with the clamp head, a second clamp surface and a pair of guide formations, with the threaded elongate member being actuatable by rotation to cause the clamp head to move along the threaded elongate member to move the first clamp surface towards the second clamp surface to close a slot, when the mounting plate is received in the slot, to clamp the mounting plate between the clamp surfaces in attachment of the mountable component to the mounting plate, and the pair of guide formations are adapted to guide the movement of the clamp head into closure of the slot.

12 Claims, 6 Drawing Sheets

(56) References Cited

U.S. PATENT DOCUMENTS

| | | | | |
|---|---|---|---|---|
| 7,665,707 B2* | 2/2010 | Morrison | A47G 1/0633 |
| | | | 248/549 |
| 8,973,878 B2* | 3/2015 | Thompson | A47G 1/175 |
| | | | 248/221.11 |
| 9,526,381 B2* | 12/2016 | Maclaren-Taylor | A47K 10/10 |
| 9,677,705 B2* | 6/2017 | Cen | A47K 10/10 |
| 2008/0029665 A1* | 2/2008 | Bauer | A47K 10/32 |
| | | | 248/216.1 |
| 2008/0048079 A1* | 2/2008 | Albritton | A47B 95/00 |
| | | | 248/222.14 |
| 2009/0308995 A1* | 12/2009 | Kuo | A47K 10/10 |
| | | | 248/231.91 |
| 2010/0038329 A1* | 2/2010 | Pan | A47K 1/09 |
| | | | 211/88.04 |
| 2014/0306079 A1* | 10/2014 | Kuo | F16B 9/026 |
| | | | 248/222.14 |
| 2019/0374057 A1* | 12/2019 | Maclaren-Taylor | |
| | | | F16M 13/022 |

* cited by examiner

WALL MOUNT

BACKGROUND OF THE INVENTION

This invention relates to an improved wall mounting system for bathroom or kitchen accessories or the like.

South African patent no. ZA2012/05046 and Australian patent application no. 2012280895 describe a mounting system.

The specification to these applications describe the mounting system having a second component which is a tubular element. The tubular element passes over a spigot of a first component of the system to attach the first component to the second component with a clamping means which projects into the tubular element.

The tubular element is structurally critical to the mounting system and, as a result, the mounting system design is limited by the shape and dimension of this element.

The invention at least partially addresses the aforementioned problem.

SUMMARY OF INVENTION

The invention provides a mounting system for a wall mounted accessory. The mounting system includes a mounting plate which is attachable to a wall, and a mountable component which includes a clamping means having a pair of spaced clamp surfaces between which a slot is defined, wherein the clamping means is actuable to move at least one of the clamp surfaces relatively to the other to close the slot and, when the mounting plate is received in the slot, to clamp the mounting plate between the clamp surfaces in attachment of the mountable component to the mounting plate.

The mountable component may include the accessory, either directly engaged thereto, or integrally formed therewith.

The mounting system may include an accessory support to which the accessory is attached, engageable with the mountable component.

The mounting plate may be bevelled or chamfered at least partly along diametrically opposed edges of the plate to provide a first and a second bevelled surface.

Each bevelled surface may face the wall, when the mounting plate is attached to the wall, and slope inwardly towards the wall.

Each clamp surface may be shaped complementary to a respective bevelled surface to allow each surface to ride over the bevelled surface when the clamping means is actuated to draw the mountable component towards the wall.

The clamping means may include a clamp head and an actuator engaged with the clamp head.

The clamp head may include one of the clamp surfaces.

The actuator may be a threaded elongate member which is actuated by rotation to cause the clamp head to move along the threads of the member into the slot.

The clamping means may include guide formations that guide the movement of the clamp head into the slot whilst preventing the clamp head from rotating with the actuator.

BRIEF DESCRIPTION OF THE DRAWINGS

The invention is further described by way of examples with reference to the accompanying drawings in which.

DESCRIPTION OF PREFERRED EMBODIMENTS

Figure 1:
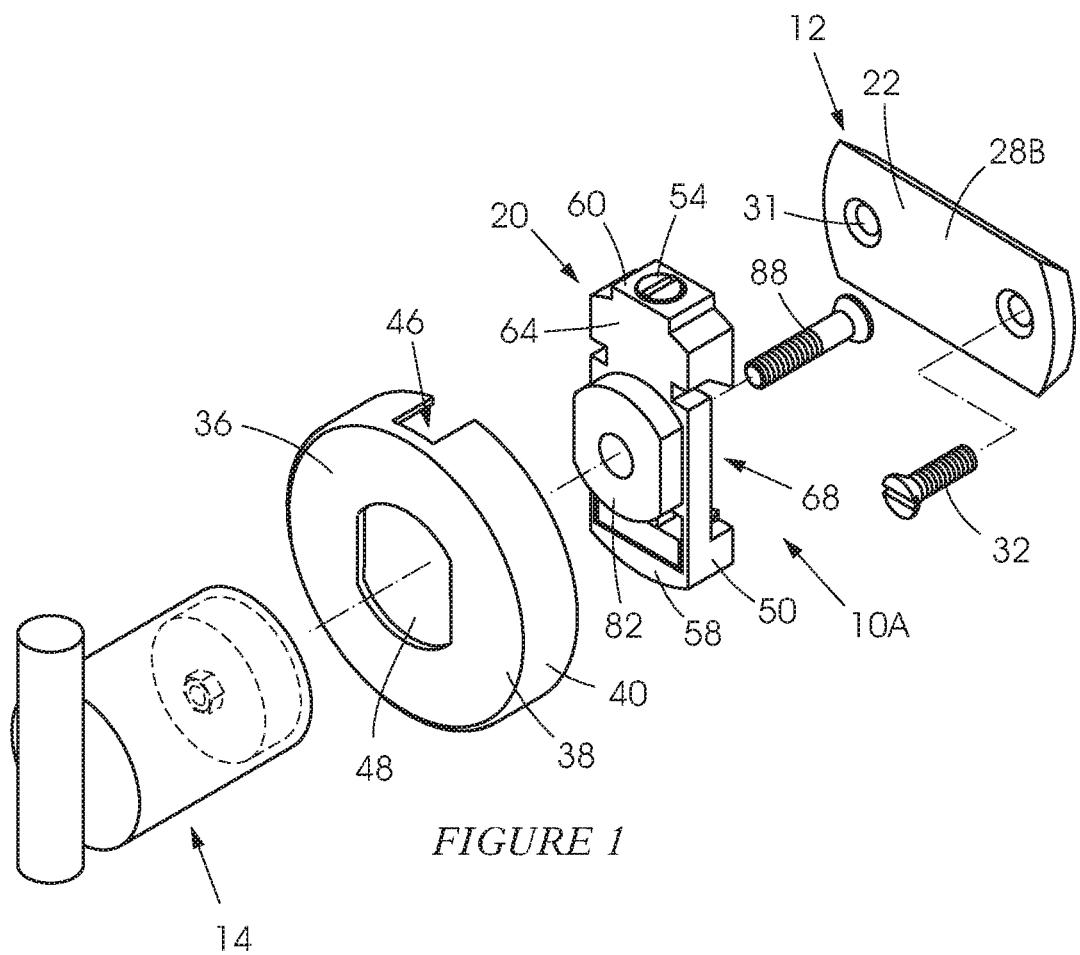
FIG. 1 and FIG. 5 are exploded views in perspective of the components making up a mounting system in accordance with a first embodiment of the invention.
Figure 2:
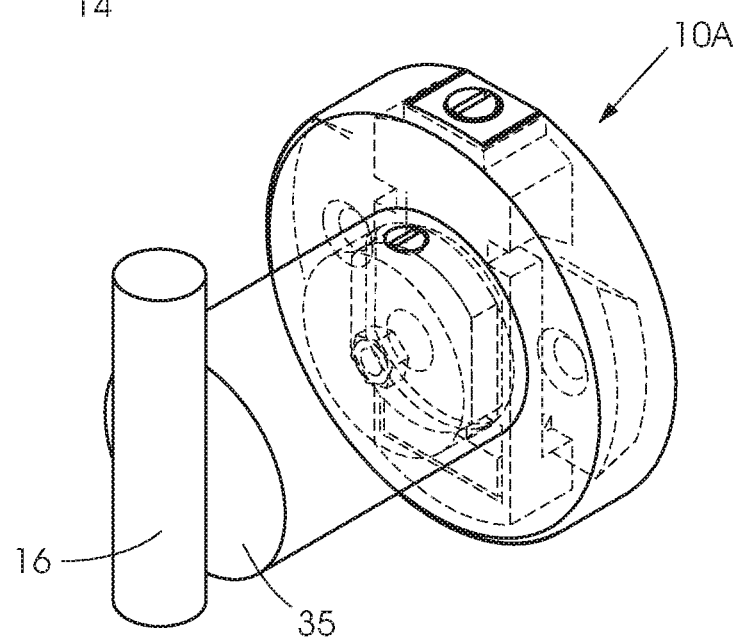
FIG. 2 is an assembled view in perspective of the mounting system of FIG. 1.

FIGS. 1-6 of the accompanying drawings illustrate a mounting system 10A according to a first embodiment of the invention, which includes a first wall mountable component 12, which attaches to a wall 13 (see FIG. 6) in use, a second component 14 to which is attached a wall mounted accessory 16, which, in this particular example, is a hook and a clamping means 20.

Figure 3:
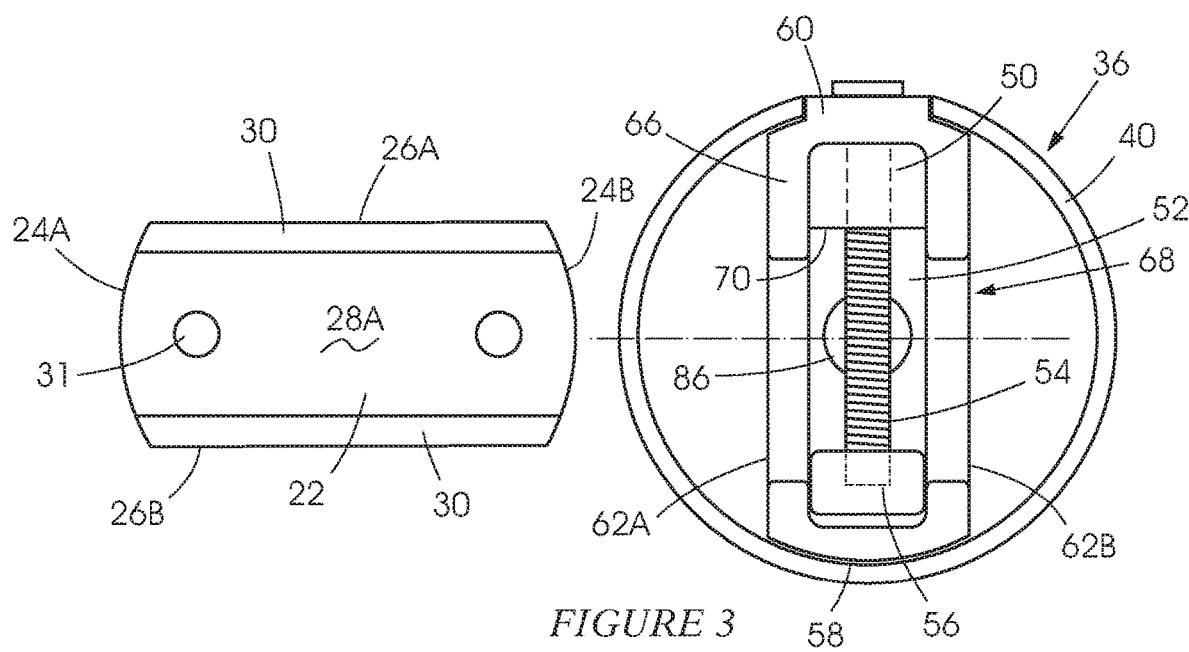
FIG. 3 and FIG. 4 are views of the mounting system of FIG. 1, disengaged and engaged respectively to a wall mountable component of the system.

With particular reference to FIG. 3, the first component 12 comprises a wall mount plate 22 which is defined between a pair of arched sides, respectively designated 24A and 24B, a pair of parallel sides, respectively designated 26A and 26B, and outer and inner facing surfaces, respectively designated 28A and 28B.

Figure 5:
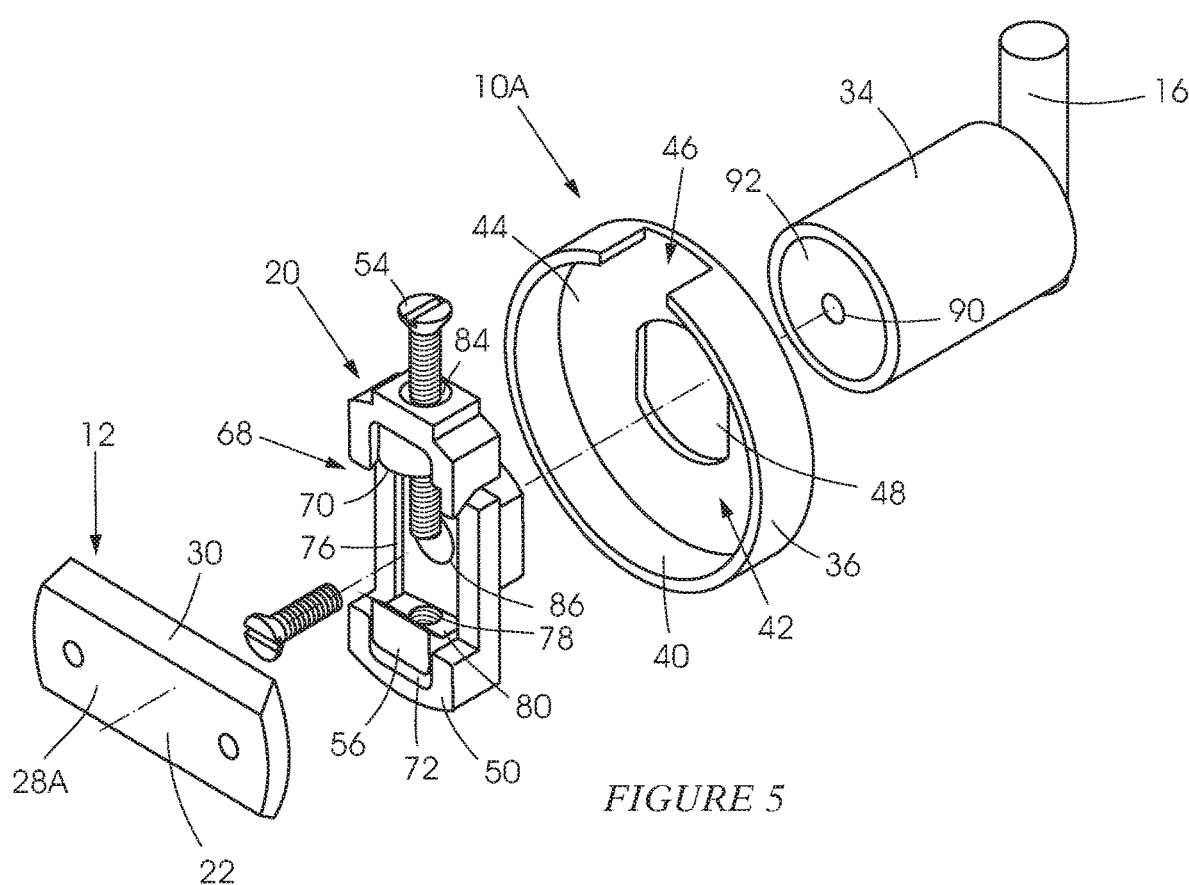

Each of the parallel sides is bevelled as best illustrated in FIGS. 3 and 5, to present a bladed surface 30, with each bladed surface sloping inwardly from the outer to the inner surface such that, when the plate is mounted to the wall, each bladed surface faces the wall.

A pair of holes 31 are formed through the plate 22 to provide a means of attaching the plate to the wall with the passage through each hole of a respective fastening means such as, for example, a screw 32.

The second component 14 includes a tubular element 34, at a projecting end 35 of which the accessory 16 is attached, and a cover plate 36.

The cover plate 36 is comprised of a disc 38 circumscribed by a perimeter wall 40 which stands proud of the disc. A circular recess 42 is defined between a wall facing surface 44 of the disc and the wall 40. A cut away 46 is formed in the wall.

In the centre of the disc, a locating aperture 48 is provided. The locating aperture is shaped to complement a part of the clamping means 20, as will be more fully described below, to receive and locate the clamping means within the circular recess.

The clamping means 20 includes a body 50, an actuator 52 which, in this particular embodiment, is a blunt-end screw 54 and a clamp head 56.

The body 50 is essentially rectangular polyhedral in shape and with reference to FIGS. 1 and 3, defined in its longitudinal extent between a first and a second end, respectively designated 58 and 60, parallel sides 62A and 62B and a cover plate presenting face 64. On an underside 66, a slot 68 is formed that runs across the body. An obliquely angled abutment surface 70 is defined on an edge of the slot.

The clamp head 56 is engaged with the body 50 in a space 72 formed in the underside 66 to receive the head 56. The clamp head 56 is adapted to move in the space 72 relatively to the body in the longitudinal direction towards the abutment surface 70, advancing into the slot 68. The clamp head is guided in this movement by having grooves on each of its sides (not shown), which engage with respective ridge formations (not shown) on an inner surface 76 of each parallel side (62A, 62B).

The clamp head 56 has a threaded recess 78 to provide a means for engaging the screw 54 with the clamp head.

The clamp head 56 presents, along a leading edge thereof, an obliquely angled clamp surface 80.

The body 50 is sized to fit within the circular recess 42 with the ends (58, 60) slightly curved with a radius of curvature complementing the radius of curvature of the wall 40 of the cover plate 36. The second end 60 is provided with a protruding formation 81 (see FIG. 4) which is shaped to fit into the cut away 46 to position and locate the body within the recess 42. This is complemented by a locating formation 82 (see FIG. 1) which protrudes from the face 64 and which is complementarily shaped to the locating aperture 48 of the cover plate 36 to fit therein to locate the body.

The body 50 includes a screw receiving passage 84 which is longitudinally aligned and in register with the threaded recess 78 of the clamp head 56 and which opens at the protruding formation 81.

A hole 86 penetrates the body 50 through the locating formation.

The clamping means 20 is engaged with the second component 14 by locating the body 50 within the circular recess 42 by the means described above. A bolt 88 is then passed through the hole 86 from the underside 66 into a counterpart threaded aperture 90 in a leading wall 92 of the tubular element 34. On tightening of the bolt, the element and the body are drawn together on either side of the cover plate disc 38.

With the body 50 engaged with the cover plate 36 and attached to the tubular element 34, the actuator screw 54 is threaded through the screw receiving passage 84, over the slot 68, and into the threaded recess 78 to attach the screw to the clamp head 56.

An explanation on how the mounting system 10A is attached to the wall 13 follows.

Optionally, a vinyl adhesive sticker (not shown) of complementary shape to the plate 22 is applied to the wall in a desired position. The sticker can have circular marks pre-marked thereon to indicate, to an installer, where to make drill holes 96.

After drilling the holes 96, the plate 22 is positioned over the sticker, inner facing side 28A facing the wall, so that each hole 31 is in register with a respective drill hole. A screw 32 is then passed through each hole, into each pre-plugged drill hole 96, and screwed to fasten the plate 22 firmly in place onto the wall 13.

Figure 4:
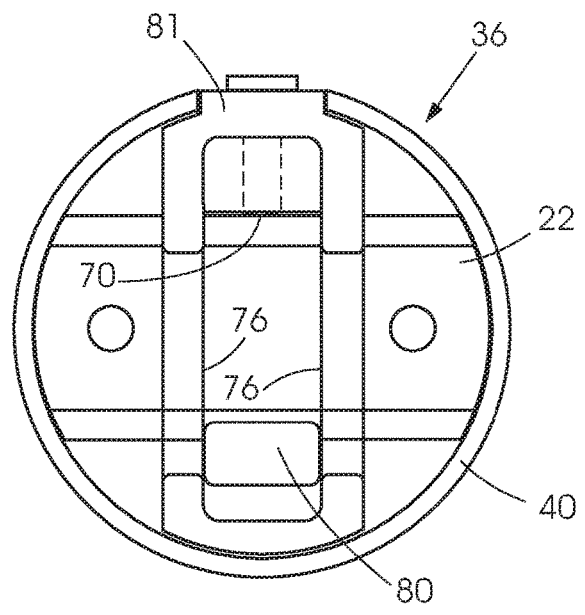

Once the plate 22 is attached to the wall 13, the second component 14, engaged with the clamping means 20, is attached to the plate by orientating the second component such that the plate is inserted within the slot. The plate is now wedged in on side 26A by abutment surface 70, and on side 26B by clamp surface 80. This position of the plate within the slot is illustrated in FIG. 4.

To secure the second component 14 to the first component 12 (or plate 22), the screw 54 is turned to cause the clamp head 56 to advance along the screw into the slot, towards the abutment surface 70. The clamp head is prevented from rotating with the screw due to the engagement of the clamp head with the body 52 as described above.

Effectively, the plate 22 is clamped between the advancing clamp head and the abutment surface. However, due to the complementary shape of the clamp surface 80 and the abutment surface 70 with the respective bladed surfaces 30, the surfaces (70, 80) ride over the bladed formation surfaces and, in so doing, draws the second component towards the wall 13.

Figure 6:
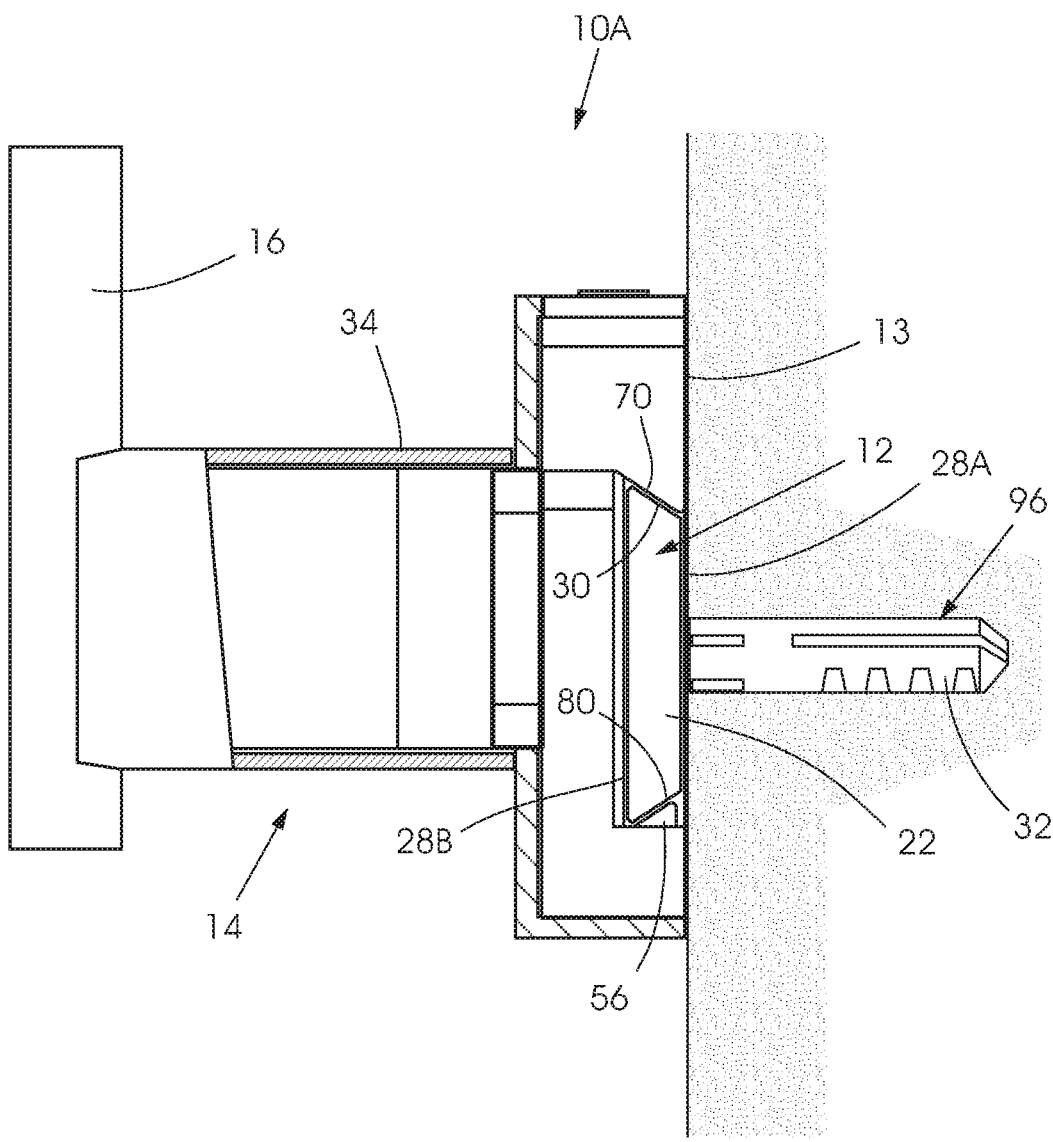
FIG. 6 is a side view of the mounting system of FIG. 1.
Figure 7:
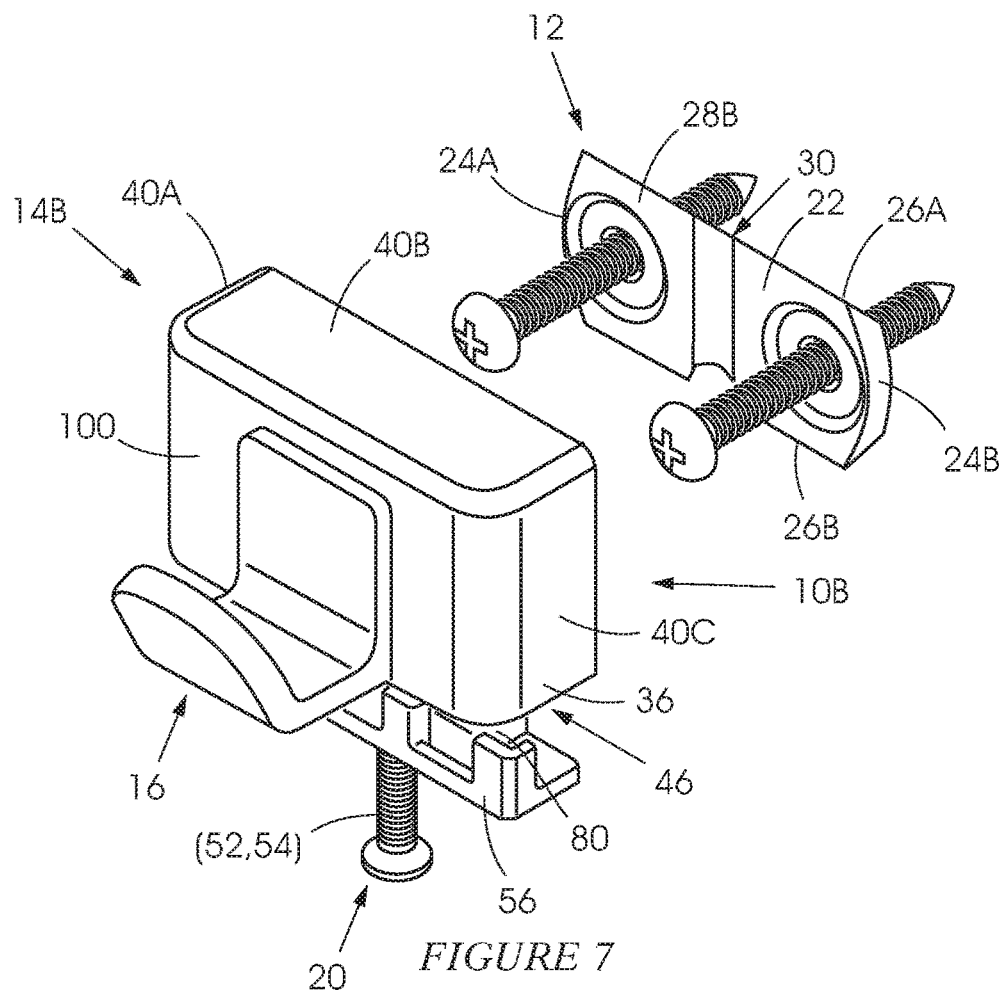
FIG. 7 is an exploded view in perspective of the components making up a mounting system in accordance with a second embodiment of the invention.

FIGS. 7 to 10 of the accompanying drawings illustrate a mounting system 10B according to a second embodiment of the invention. This embodiment, like the first embodiment (10A), includes a first wall mountable component 12, which attaches to a wall 13 (as illustrated in FIG. 6) in use, a second component 14B to which is attached a wall mounted accessory 16.

Like the mounting system 10A, the first component 12 of the system (101B) comprises a wall mount plate 22 which is defined between a pair of arched sides, respectively designated 24A and 24B, a pair of parallel sides, respectively designated 26A and 26B, and outer and inner facing surfaces, respectively designated 28A and 28B.

Figure 8:
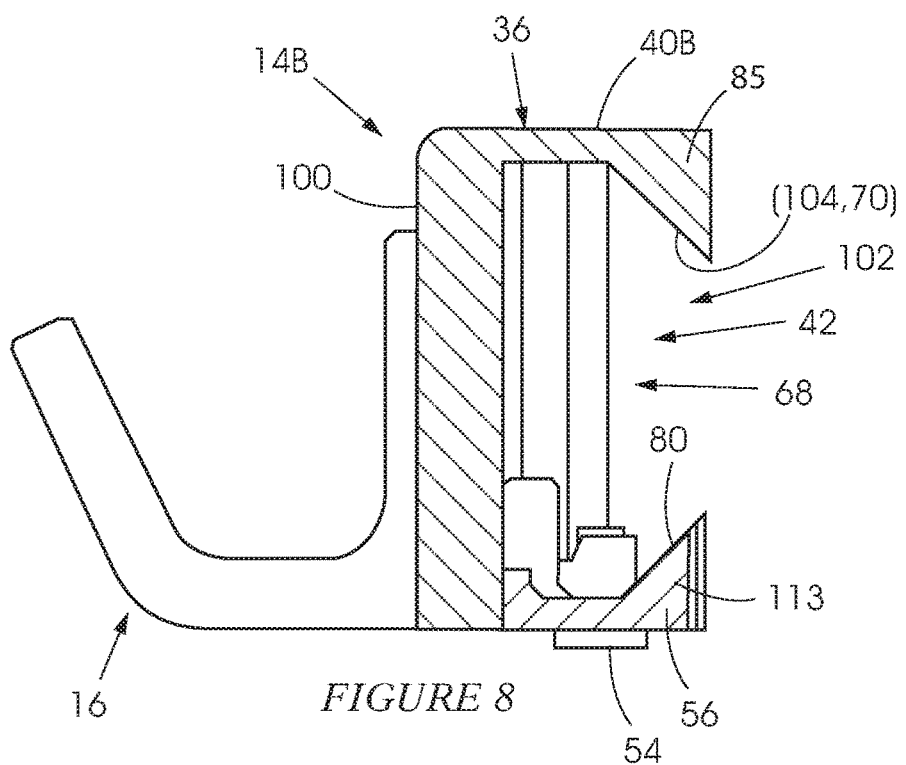
FIG. 8 is a side sectioned view of a second component of the mounting system of FIG. 7.

Each of the parallel sides is bevelled as best illustrated in FIG. 8, to present a bladed surface 30, with each bladed surface sloping inwardly from the outer to the inner surface such that, when the plate is mounted to the wall, each bladed surface faces the wall.

It is in the second component 14 where the mounting system 10B differs from 10A. In describing the mounting system 10B hereinafter, like features will bear like designations.

In the system 10A, the second component 14 includes the tubular element 34 and a cover plate 36, as separate components to the clamping means 20. In the system 10B, the functionality of the component 14 and a part of the clamping means 20 is integrated into the second component 14B.

The second component 14B includes a box-shaped housing 36 defined by sidewalls 40A, 40B and 40C, and an outer facing wall 100 to which the wall mounted accessory is engaged. A partial enclosure 42 is defined within the walls (40A, 40B, 40C, 100).

The housing 36 is open along an open side 46 opposed to the side wall 40B and partially open at an inner facing side 102 opposed to wall 100.

The housing 36 includes a lip 85 which is an extension of sidewall 40B, overhanging into the enclosure 42 to partially close the side 102. An inner side of this lip 104 is obliquely angled to provide an abutment surface 70 (see FIG. 8).

Figure 9:
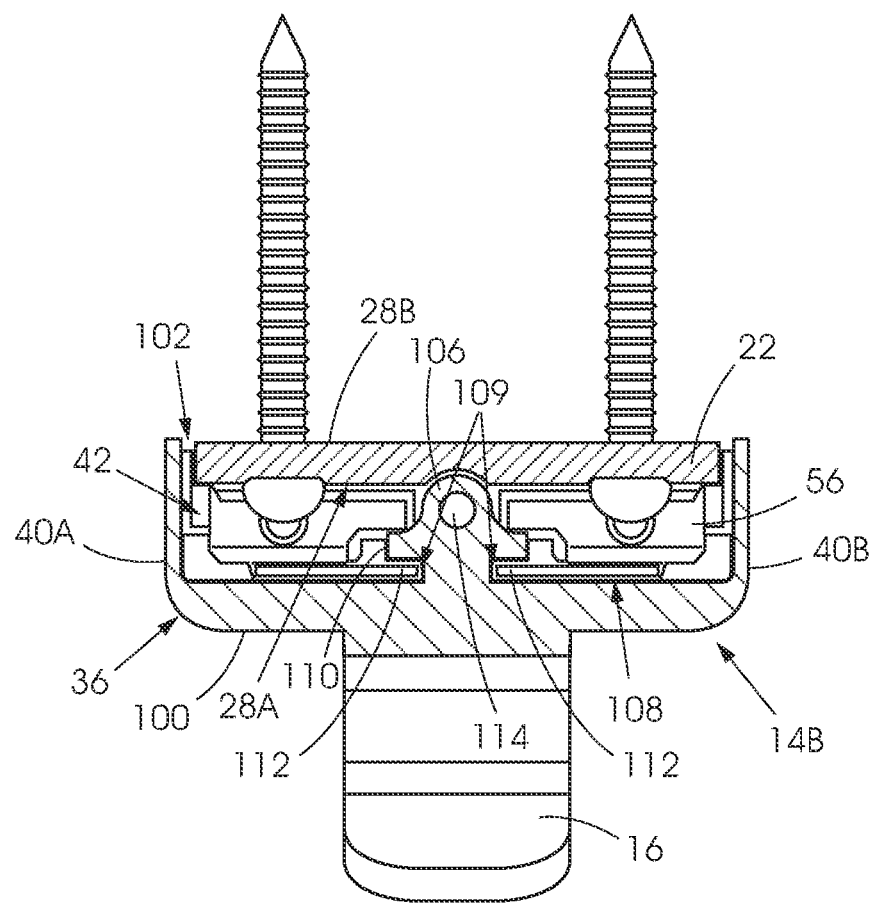
FIG. 9 is a sectioned view in plan of the mounting system of FIG. 7.

A clamping means 20, comprising of an actuator 52 (as a blunt-end screw 54) and a clamp head 56, engages with the second component 14 by being of complementary shape and dimension to fit within the enclosure 42 from the open side 46, held within the enclosure and guided in movement therein by a guiding formation 106 which is formed on an inner wall 108 of the housing 36 (see FIG. 9).

The guiding formation 106 has a pair of undercut formations 109. Each guiding formation receives, in slotted engagement, a respective complementary groove 110 of the clamp head. Engagement of a pair of splines 112 at a mouth of each groove within the undercut formations prevent the clamp head 56 from pulling away from the housing 36, holding the clamp head within the enclosure and guiding movement of the clamp head relatively to the housing.

The clamp head 56 has a threaded recess (not shown) into which the screw 54 engages the head 56. The clamp head presents, partially along a leading inner surface at the head, a lip 113 with an inner side of this lip obliquely angled to provide a clamp surface 80 (see FIG. 8).

The guiding formation 106 includes a screw receiving passage 114 which is longitudinally aligned and in register with the threaded recess of the clamp head 56. When the clamping means 20 is engaged with the housing 56 of the second component 14, the screw 54 is threaded through the threaded recess and into the passage 114.

With the clamp head 56 now engaged with the housing 56 within the enclosure 42, a slot 68 is defined between the abutment surface 70 and the clamp surface 80 (see FIG. 8).

The plate 22 is attached to the wall 13 in the manner described with respect to the mounting system 10A.

Figure 10:
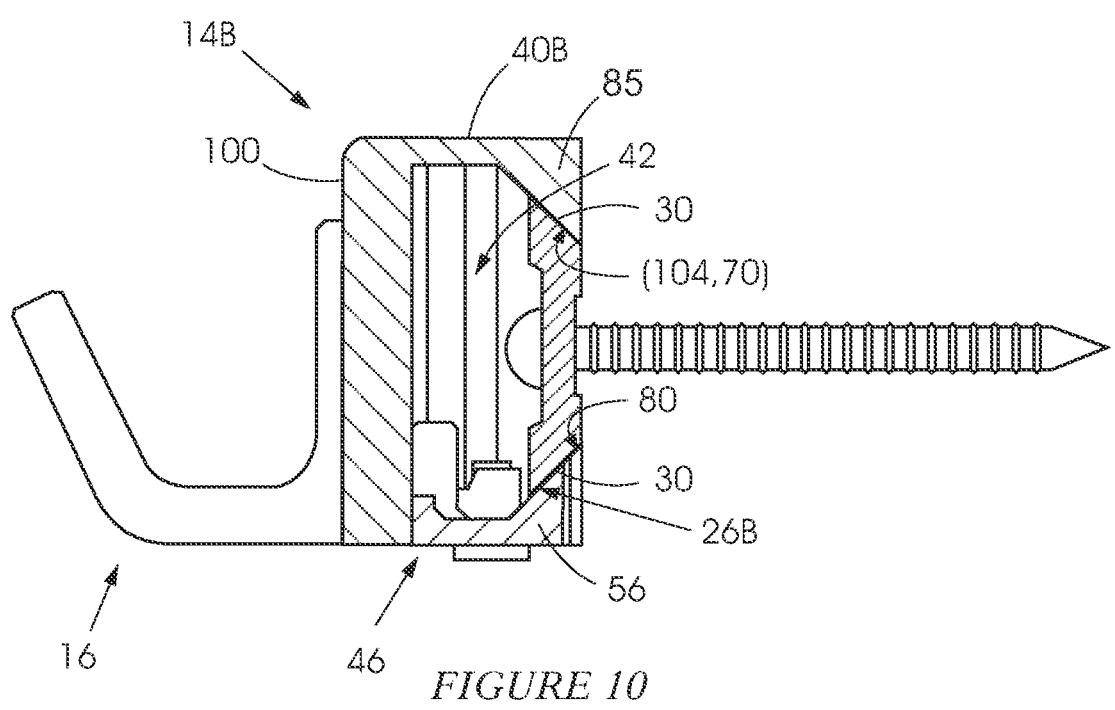
FIG. 10 is a sectioned side view of the mounting system of FIG. 7 with the second component of the system engaged with a wall mountable component of the system.

With the plate 22 attached to the wall 13, the second component 14, is attached to the plate by orientating the second component such that the plate is inserted within the slot 68. The plate is now wedged in on side 26A by abutment surface 70, and on side 26B by clamp surface 80. This position of the plate within the slot is illustrated in FIG. 10.

To secure the second component 14 to the first component 12 and by implication the plate 22, the screw 54 is turned to cause the clamp head 56 to advance along the screw guided by the guiding formation 106, into the slot, towards the abutment surface 70. The clamp head is prevented from rotating with the screw by engagement with the guiding formation and the confines of the enclosure 42.

Effectively, the plate 22 is clamped between the advancing clamp head 56 and the abutment surface 70. However, due to the complementary shape of the clamp surface 80 and the abutment surface 70 with the respective bladed surface 30, the surfaces (70, 80) ride over the respective bladed formation surfaces to draw the second component towards the wall 13.

By employing the mounting systems 10A and 10B, in accordance with both embodiments of the invention, the accessory 16 is securely attached to the wall 13 without loosening over time, at the point of attachment, to the same extent and rate as is the case with prior art systems.

An advantage over the mounting system of the parent application is that the clamping means 20 is not included within the tubular element. With the tubular element no longer a structurally critical component, the element is freed up to be of any shape or dimension required.

The invention claimed is:

1. A mounting system for a wall mounted accessory, the mounting system comprising:
   (a) a mounting plate which is attachable to a wall,
   (b) a mountable component which includes a clamping means having
      a clamp head with a first clamp surface,
      a threaded elongate member engaged with the clamp head, and
      a body having a first end, a second end, a first side, a second side and a longitudinal extent between the first end and the second end, the first and second sides extending between the first end and the second end, the second side being parallel to the first side, the first and second sides each having an inner surface and an outer surface, the body having a presenting side and an underside, the body having a locating formation which protrudes from the presenting side, the locating formation including a hole, the body having a slot formed on the underside, the slot running in a longitudinal direction of the body and extending laterally to the inner surface of each of the first and second sides, the slot including a second clamp surface located at the second end of the body, the clamp head being engaged in the slot and, under action of the threaded elongate member, being movable in the slot relative to the body in the longitudinal direction of the body towards the second clamp surface,
   wherein the threaded elongate member passes through the second end of the body and is engaged with the clamp head,
   wherein the threaded elongate member is actuatable by rotation to cause the clamp head to move along the threaded elongate member to advance the first clamp surface within the slot towards the second clamp surface to thereby close the slot, when the mounting plate is received in the slot, to clamp the mounting plate between the first and second clamp surfaces in attachment of the mountable component to the mounting plate,
   wherein the body is adapted to guide the movement of the clamp head into closure of the slot, while preventing the clamp head from rotating with the threaded elongate member and while preventing the clamp head from pulling away from the mountable component,
   (c) a tubular element with a threaded aperture, and
   (d) a bolt extending from the underside of the body, through the hole of the locating formation into the threaded aperture of the tubular element, the bolt securing the tubular element to the body.

2. The mounting system according to claim 1 in combination with the wall mounted accessory, wherein the tubular element is an accessory support, and wherein the wall mounted accessory is attached to the accessory support.

3. The mounting system in combination with the wall mounted accessory according to claim 2, wherein the wall mounted accessory is a hook.

4. The mounting system according to claim 1, wherein the mounting plate is bevelled at least partly along diametrically opposed edges of the mounting plate to provide a first bevelled surface and a second bevelled surface.

5. The mounting system according to claim 4, wherein each bevelled surface faces the wall, when the mounting plate is attached to the wall, and slopes inwardly towards the wall.

6. The mounting system according to claim 5, wherein each of the first and second clamp surfaces is shaped complementary to a respective one of the first and second bevelled surfaces to ride over the respective one of the first and second bevelled surfaces when the clamping means is actuated to draw the mountable component towards the wall.

7. The mounting system according to claim 1, further comprising a cover plate with a locating aperture, the cover plate located between the tubular element and the presenting side of the body with the locating formation extending through the locating aperture.

8. The mounting system according to claim in combination with the wall mounted accessory, wherein the wall mounted accessory is a hook.

9. The mounting system according to claim 1 in combination with the wall mounted accessory, wherein the wall mounted accessory is a hook.

10. The mounting system according to claim 1 in combination with the wall mounted accessory, wherein the tubular element is an accessory support, and wherein the wall mounted accessory is a bathroom or kitchen accessory attached to the accessory support.

11. A mounting system for a wall mounted accessory, the mounting system comprising:
   (a) a mounting plate which is attachable to a wall,
   (b) a mountable component which includes a clamping means having
      a clamp head with a first clamp surface,
      a threaded elongate member engaged with the clamp head, and
      a body having a first end, a second end, a first side, a second side and a longitudinal extent between the first end and the second end, the first and second sides extending between the first end and the second end, the second side being parallel to the first side, the first and second sides each having an inner surface and an outer surface, the body having a presenting side and an underside, the body having a locating formation which protrudes from the presenting side, the locating formation including a hole, the body having a slot formed on the underside, the slot running in a longitudinal direction of the body and extending laterally to the inner surface of each of the first and second sides, the slot including a second clamp surface located at the second end of the body, the clamp head being engaged in the slot and, under action of the threaded elongate member, being movable in the slot relative to the body in the longitudinal direction of the body towards the second clamp surface,
   wherein the threaded elongate member passes through the second end of the body and is engaged with the clamp head,
   wherein the threaded elongate member is actuatable by rotation to cause the clamp head to move along the threaded elongate member to advance the first clamp surface within the slot towards the second clamp surface to thereby close the slot, when the mounting plate is received in the slot, to clamp the mounting plate between the first and second clamp surfaces in attachment of the mountable component to the mounting plate,
   wherein the body is adapted to guide the movement of the clamp head into closure of the slot, while preventing the clamp head from rotating with the threaded elongate member and while preventing the clamp head from pulling away from the mountable component,
   (c) a protruding element with a threaded aperture,
   (d) a bolt extending from the underside of the body, through the hole of the locating formation into the threaded aperture of the protruding element, the bolt securing the protruding element to the body, and
   (e) a cover plate with a locating aperture, the cover plate located between the protruding element and the presenting side of the body with the locating formation extending through the locating aperture.

12. The mounting system according to claim 11 in combination with the wall mounted accessory, wherein the wall mounted accessory is a hook.

* * * * *